(12) United States Patent
Ganapathi et al.

(10) Patent No.: US 10,959,113 B2
(45) Date of Patent: *Mar. 23, 2021

(54) AUTOMATIC PERFORMANCE MONITORING AND HEALTH CHECK OF LEARNING BASED WIRELESS OPTIMIZATION FRAMEWORK

(71) Applicant: salesforce.com, inc., San Francisco, CA (US)

(72) Inventors: Tejaswini Ganapathi, San Francisco, CA (US); Satish Raghunath, Sunnyvale, CA (US); Xu Che, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/398,990

(22) Filed: Apr. 30, 2019

(65) Prior Publication Data

US 2019/0261200 A1    Aug. 22, 2019

Related U.S. Application Data

(63) Continuation of application No. 15/803,586, filed on Nov. 3, 2017, now Pat. No. 10,405,208.

(51) Int. Cl.
*H04W 24/02* (2009.01)
*H04W 24/08* (2009.01)

(52) U.S. Cl.
CPC ........... *H04W 24/02* (2013.01); *H04W 24/08* (2013.01)

(58) Field of Classification Search
CPC .. H04W 24/02; H04W 24/08; H04L 41/0893; H04L 43/08
See application file for complete search history.

(56) References Cited

U.S. PATENT DOCUMENTS

| | | | |
|---|---|---|---|
| 10,205,634 B2 | 2/2019 | Gal et al. | |
| 10,405,208 B2 * | 9/2019 | Ganapathi | H04W 24/02 |
| 2014/0304395 A1 | 10/2014 | Chandrayana et al. | |
| 2019/0141543 A1 | 5/2019 | Ganapathi et al. | |
| 2019/0342770 A1 * | 11/2019 | Ganapathi | G06N 20/00 |

OTHER PUBLICATIONS

United States Patent and Trademark Office, U.S. Appl. No. 15/803,586, Notice of Allowance dated Apr. 10, 2019.

* cited by examiner

*Primary Examiner* — Jackie Zuniga Abad
(74) *Attorney, Agent, or Firm* — Wong & Rees LLP; Zhichong Gu

(57) ABSTRACT

Network traffic data associated with computer applications is collected based on static policies. First network parameter vectors are generated over a time period. Each network parameter vector of the first network parameter vectors comprises first optimal values, estimated by a Bayesian learning module using a generative model, for network parameters. Second network parameter vectors are generated over the same time period. Each network parameter vector of the second network parameter vectors comprises second optimal values, computed by a best parameter generator through optimizing an objective function, for the network parameters. It is determined whether the first network parameter vectors converge to the second network parameter vectors and whether network parameter optimization for the network parameters is performing normally.

21 Claims, 7 Drawing Sheets

AUTOMATIC PERFORMANCE MONITORING AND HEALTH CHECK OF LEARNING BASED WIRELESS OPTIMIZATION FRAMEWORK

CROSS-REFERENCE TO RELATED APPLICATIONS

This application is a Continuation of U.S. patent application Ser. No. 15/803,586 filed on Nov. 3, 2017, the contents of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNOLOGY

The present invention relates generally to optimizing network policies in content delivery, and in particular, to automatic performance monitoring and health check of learning based wireless optimization framework.

BACKGROUND

Cellular networks are very volatile and diverse. Due to the nature of the wireless channel, link conditions change at a fine timescale. Metrics such as latency, jitter, throughput, and losses are hard to bound or predict. The diversity comes from the various network technologies, plethora of devices, platforms, and operating systems in use.

Techniques that rely on compression or right-sizing content do not address the fundamental issues of network volatility and diversity as they impact the transport of data. Irrespective of the savings in compression, the data still has to weather the vagaries of the network, operating environment, and end device.

Transmission Control Protocol (TCP) plays an important role in the content delivery business: it provides a reliable, ordered, and error-checked delivery of a stream of octets between applications running on hosts communicating by an IP network. Major Internet applications, such as the World Wide Web, email, remote administration, and file transfer, rely on TCP. Numerous parameters may be used in TCP to help in ordered data transfer, retransmission of lost packets, error-free data transfer, flow control, and congestion control. However, identifying optimal data values for TCP parameters based on changing network characteristics remains a challenge.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1:
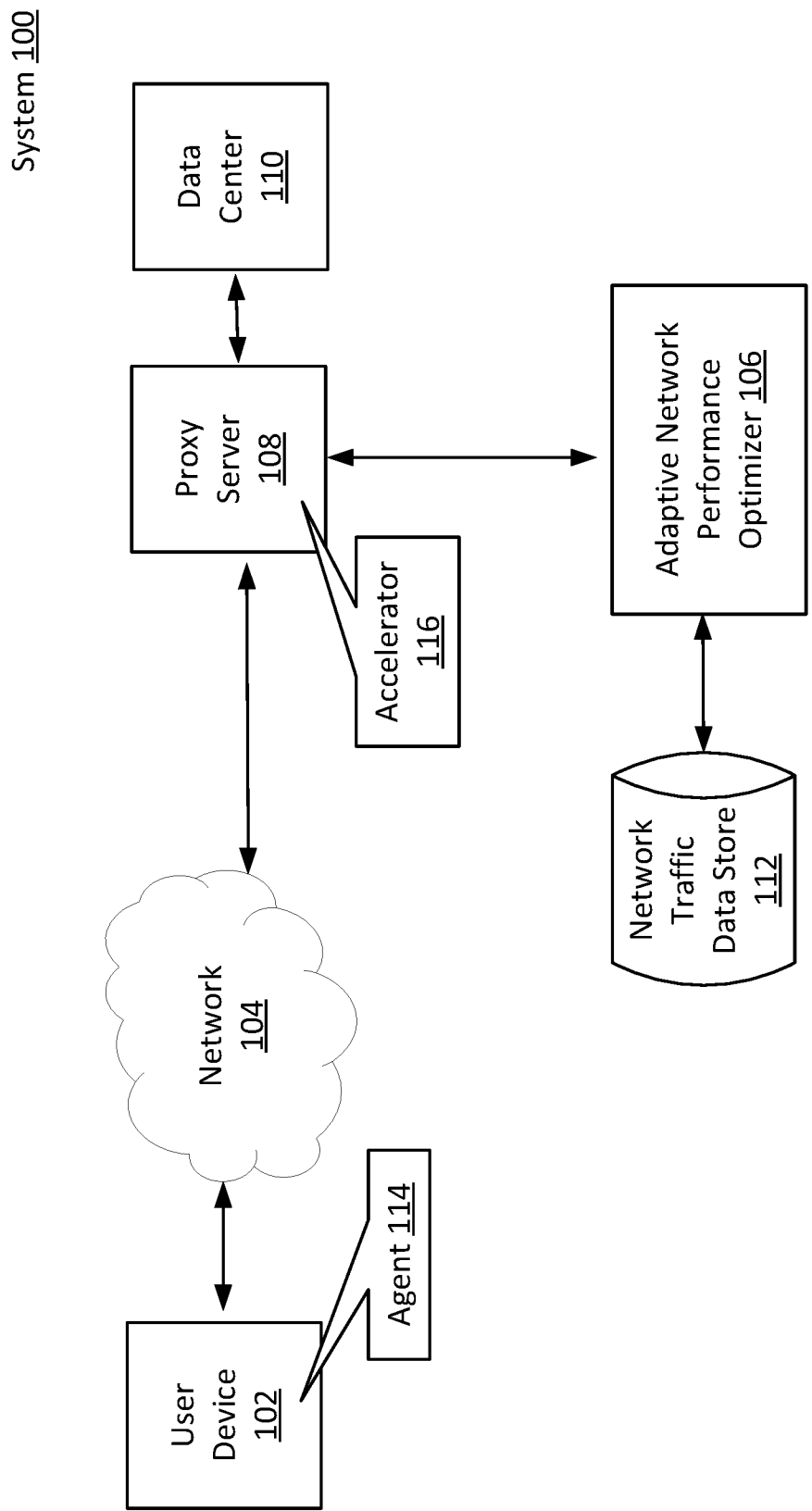
FIG. 1 illustrates a high-level block diagram, according to an embodiment of the invention.

Example embodiments, which relate to automatic performance monitoring and health check of learning based wireless optimization framework, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. GENERATING ADAPTIVE LEARNING DATASETS
3. ESTIMATING PARAMETERS USING ADAPTIVE LEARNING DATASETS
4. MONITORING OPTIMIZATION FRAMEWORK
5. EXAMPLE NETWORK OPTIMIZATION SYSTEM
6. CONVERGENCE ON OPTIMUM NETWORK PARAMETERS
7. EXAMPLE PROCESS FLOWS
8. IMPLEMENTATION MECHANISMS—HARDWARE OVERVIEW
9. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Modern data transport networks feature a huge variety of network technologies, end-user devices, and software. Some of the common network technologies include cellular networks (e.g., LTE, HSPA, 3G, older technologies, etc.), Wi-Fi (e.g., 802.11xx series of standards, etc.), satellite, microwave, etc. In terms of devices and software, there are smartphones, tablets, personal computers, network-connected appliances, electronics, etc., that rely on a range of embedded software systems such as Apple iOS, Google Android, Linux, and several other specialized operating systems. There are certain shared characteristics that impact data delivery performance:
 a. Many of these network technologies feature a volatile wireless last mile. The volatility manifests itself in the application layer in the form of variable bandwidth, latency, jitter, loss rates and other network related impairments.
 b. The diversity in devices, operating system software and form factors results in a unique challenge from the perspective of user experience.
 c. The nature of content that is generated and consumed on these devices is quite different from what was observed with devices on the wired Internet. The new content is very dynamic and personalized (e.g., adapted to location, end-user, other context sensitive parameters, etc.).

A consequence of these characteristics is that end-users and applications experience inconsistent and poor performance. This is because most network mechanisms today are not equipped to tackle this new nature of the problem. In terms of the transport, today's client and server software systems are best deployed in a stable operating environment where operational parameters either change a little or do not change at all. When such software systems see unusual network feedback they tend to over-react in terms of remedies. From the perspective of infrastructure elements in the network that are entrusted with optimizations, current techniques like caching, right sizing, and compression fail to deliver the expected gains. The dynamic and personalized nature of traffic leads to low cache hit-rates and encrypted traffic streams that carry personalized data make content modification much harder and more expensive.

Modern heterogeneous networks feature unique challenges that are not addressed by technologies today. Unlike the wired Internet where there was a stable operating environment and predictable end device characteristics, modern heterogeneous networks require a new approach to optimize data delivery. To maximize improvement in throughput gain and download complete time, network parameters (or TCP parameters) may be estimated using a data driven approach by analyzing prior wireless network traffic data. Because wireless networks are volatile and non-stationary (i.e., statistics change with time), estimating network parameters (or TCP parameters) poses several challenges. The estimate should be adaptive to capture volatilities in the wireless network, but also stable and not overly sensitive to short term fluctuations. Further, raw network traffic data does not capture the performance in improvement of throughput and download complete time of a particular set of network parameters (or TCP parameters). Methods and techniques described herein adaptively estimates network parameters (or TCP parameters) by developing algorithms that operate on past data.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Generating Adaptive Learning Datasets

The performance of data delivery is closely tied to the operating conditions within which the end-device is operating. With ubiquitous wireless access over cellular and Wi-Fi networks, there is a lot of volatility in operating conditions, so acceleration techniques must adapt to such a network by adapting to these conditions, e.g., the performance achievable over a private Wi-Fi hotspot is very different from that with a cellular data connection. An accelerator 116, as illustrated in FIG. 1, dynamically adapts to these conditions and picks the best strategies based on the context.

The context captures the information about the operating conditions in which data transfer requests are being made. This includes, but not limited to, any combination of:
 Type of device, e.g., iPhone, iPad, Blackberry, etc.
  This may also include the version of the device and manufacturer information.
 Device characteristics, e.g., the type of its modem, CPU/GPU, encryption hardware, battery, NFC (Near Field Communication) chipset, memory size and type or any other hardware information that impacts performance.
 Mobility of device, e.g., whether the device is on a moving vehicle/train etc., or is stationary/semi-stationary.
 Operating System on the device.
 Operating System characteristics, e.g., buffering, timers, public and hidden operating system facilities (APIs), etc.
  This may also include operating system limitations such as number of simultaneous connections allowed to a single domain, etc.
 Usage information related to various device elements, e.g., Memory, Storage, CPU/GPU etc.
 Battery charge and mode of powering the device.
 Time of day.
 Location where available.
 IP Address and port numbers.
 Network type, e.g., Wi-Fi or Cellular, or 3G/4G/LTE, etc., or Public/Home Wi-Fi, etc.
 SSID (Service Set Identifier) in Wi-Fi networks.
 802.11 network type for Wi-Fi networks.
 Service Provider information, e.g., AT&T or Verizon for cellular, Time Warner or Comcast for Wi-Fi, etc.
 Strength of signal from the access point (e.g., Wi-Fi hot spot, cellular tower, etc.) for both upstream and downstream direction.
 Cell-Tower or Hot-Spot identifier in any form.
 Number of sectors in the cell tower or hot spot.
 Spectrum allocated to each cell tower and/or sector.
 Any software or hardware limitation placed on the hotspot/cell tower.
 Any information on the network elements in the path of traffic from device to the content server.
 Firewall Policy rules, if available.
 Any active measurements on the device, e.g., techniques that measure one-way delay between web-server and device, bandwidth, jitter, etc.
 Medium of request, e.g., native app, hybrid app, web-browser, etc.
  Other information describing the medium, e.g., web browser type (e.g., Safari, Chrome, Firefox etc.), application name, etc.

Any other third party software that is installed on the device which impacts data delivery performance.

Content Type, e.g., image, video, text, email, etc.
  Also includes the nature of content if it is dynamic or static.

Content Location, e.g., coming from origin server or being served from a CDN (Content Delivery Network).
  In the case of a CDN, any optimization strategies being employed, if available.

Recent device performance statistics, e.g., dropped packets, bytes transferred, connections initiated, persistent/on-going connections, active memory, hard disk space available, etc.

Caching strategies if any, that are available or in use on the device or by the application requesting the content.

In the case of content, where multiple objects have to be fetched to completely display the content, the order in which requests are placed and the order in which objects are delivered to the device. The request method for each of these objects is also of interest.

Based on the operating context, a cognitive engine may be able to recommend, but is not limited to, any combination of: end-device based data delivery strategies and accelerator-based data delivery strategies.

End-device based data delivery strategies refer to methods deployed by an application (an application could be natively running on the end-device operating system, or running in some form of a hybrid or embedded environment, e.g., within a browser, etc.) to request, receive or, transmit data over the network. These data delivery strategies include, but are not limited to, any combination of:

Methods used to query the location of service point, e.g., DNS, etc.
  This may involve strategies that include, but are not limited to, any combination of: choosing the best DNS servers based on response times, DNS prefetching, DNS refreshing/caching, etc.

Protocols available for data transport, e.g., UDP, TCP, SCTP, RDP, ROHC, etc.

Methods to request or send data as provided by the operating system, e.g., sockets, CFHTTP or NSURL-Connection in Apple's iOS, HttpUrlConnection in Google's Android, etc.

Session oriented protocols available for requests, e.g., HTTP, HTTPS, FTP, RTP, Telnet, etc.

Full duplex communication over data transport protocols, e.g., SPDY, Websockets, etc.

Caching and or storage support provided in the Operating System.

Compression, right sizing or other support in the devices to help reduce size of data communication.

Transaction priorities which outline the order in which network transactions to be completed:
  E.g., this may be a list of transactions where the priority scheme is simply a random ordering of objects to be downloaded.

Content specific data delivery mechanisms, e.g., HTTP Live Streaming, DASH, Multicast, etc.

Encryption support in the device:
  Also includes secure transport mechanisms, e.g., SSL, TLS, etc.

VPN (Virtual Private Network) of any kind where available and/or configured on the device.

Any tunneling protocol support available or in use on the device.

Ability to use or influence rules on the device which dictate how the data needs to be accessed or requested or delivered.
  This includes, but is not limited to, any combination of: firewall rules, policies configured to reduce data usage, etc.

Ability to pick the radio technology to use to get/send data. For example, if allowed, the ability to choose cellular network to get some data instead of using a public Wi-Fi network.

Ability to run data requests or process data in the background.

Threading, locking, and queuing support in the Operating System.

Ability to modify radio power if available.

Presence and/or availability of any error correction scheme in the device.

In cases where middle boxes in the network infrastructure have adverse impact on performance, capabilities on the end-device to deploy mitigations such as encrypted network layer streams (e.g. IPSec, etc.).

A range of parameters determines the performance of tasks such as data delivery. With volatility and diversity, there is an explosion in the number of parameters that may be significant. By isolating parameters, significant acceleration of data delivery may be achieved. Networks, devices and content are constantly changing. Various methods of optimizing data delivery are described in U.S. Patent Publication No. 2014/0304395, entitled "Cognitive Data Delivery Optimizing System," filed Nov. 12, 2013; U.S. patent application Ser. No. 15/593,635, entitled "Adaptive Multi-Phase Network Policy Optimization," filed May 12, 2017, the entire contents of which are hereby incorporated by reference in its entirety for all purposes. Embodiments are not tied down by assumptions on the current nature of the system. An adaptive network performance optimizer 106 may use raw network traffic data to generate an adaptive learning dataset.

FIG. 1 and the other figures use like reference numerals to identify like elements. A letter after a reference numeral, such as "102a," indicates that the text refers specifically to the element having that particular reference numeral. A reference numeral in the text without a following letter, such as "102," refers to any or all of the elements in the figures bearing that reference numeral (e.g. "102" in the text refers to reference numerals "102a," and/or "102b" in the figures). Only one user device 102 (end-devices as described above) is shown in FIG. 1 in order to simplify and clarify the description.

As illustrated in FIG. 1, a system 100 includes a user device 102 that communicates data requests through a network 104. A proxy server 108 may receive the data requests and communicate the requests to a data center 110. An adaptive network performance optimizer 106 may gather information from the proxy server 108 and store information in a network traffic data store 112, in an embodiment. For example, with a priori knowledge of the possible parameter space of the network parameters (or TCP parameters), a range of values in the space may be set for each network parameter (or each TCP parameter). Then, over time, mobile network traffic may be assigned parameters from this space at random and performance data may be stored in the network traffic data store 112. The mobile network traffic data (e.g., the assigned parameters, the performance data, etc.) may be stored as static policy data in the network traffic data store 112. A subset of the traffic may be performed with default network parameters (or default TCP parameters) of the carrier and data about that traffic may be stored as bypass traffic data. Example carriers may include, but are not necessarily limited to, Verizon, AT&T, T-Mobile, Sprint, etc.; each carrier may have respective default network parameters (or default TCP parameters) for those user devices that subscribe to, or operate with, communication services (e.g., wireless data services, Wi-Fi services, etc.) of each such carrier.

Each database record in the network traffic data store 112 may include performance metrics comparing the static policy data against the bypass traffic data. For example, data representing outcomes of the download such as the throughput, download complete time, and time to first byte, may be captured in each database record in the network traffic data store 112 for each static policy. Performance metrics such as percentage improvement in throughput and download complete time of the policy applied compared to the bypass traffic may also be stored in the network traffic data store 112, in one embodiment.

Other information may also be included in each database record, in other embodiments. Typical sources of data relating to the network environment are elements in the network infrastructure that gather statistics about transit traffic and user devices that connect to the network as clients or servers. The data that can be gathered includes, but is not limited to, any combination of: data pertaining to requests for objects, periodic monitoring of network elements (which may include inputs from external source(s) as well as results from active probing), exceptional events (e.g., unpredictable, rare occurrences, etc.), data pertaining to the devices originating or servicing requests, data pertaining to the applications associated with the requests, data associated with the networking stack on any of the devices/elements that are in the path of the request or available from any external source, etc.

In an embodiment, a component may be installed in the user device 102 (agent 114) that provides inputs about the real-time operating conditions, participates and performs active network measurements, and executes recommended strategies. The agent 114 may be supplied in a software development kit (SDK) and is installed on the user device 102 when an application (e.g., a mobile app, etc.) that includes the SDK is installed on the user device 102. By inserting an agent 114 in the user device 102 to report the observed networking conditions back to the accelerator 116, estimates about the state of the network can be vastly improved. The main benefits of having a presence (the agent 114) on the user device 102 include the ability to perform measurements that characterize one leg of the session, e.g., measuring just the client-to-server leg latency, etc.

An accelerator 116 sits in the path of the data traffic within a proxy server 108 and executes recommended strategies in addition to gathering and measuring network-related information in real-time. The accelerator 116 may propagate network policies (e.g., TCP policies, etc.) from the adaptive network performance optimizer 106 to the proxy server 108, in one embodiment. In another embodiment, the agent 114 may implement one or more network policies (e.g., TCP policies, etc.) from the adaptive network performance optimizer 106. For example, the optimal number of simultaneous network connections may be propagated as a network policy (e.g., a TCP policy, etc.) from the adaptive network performance optimizer 106 through the network 104 to the agent 114 embedded on the user device 102. As another example, the transmission rate of file transfer may be limited to 20 MB/sec by the accelerator 116 as a network policy (e.g., a TCP policy, etc.) propagated by the adaptive network performance optimizer 106 based on supervised learning and performance metrics. Here, the term "supervised learning" is defined as providing datasets to train a machine to get desired outputs as opposed to "unsupervised learning" where no datasets are provided and data is clustered into classes.

Once a multitude of raw network traffic data associated with data requests between user devices 102 and the data centers 110 are logged in the network traffic data store 112, it becomes possible to aggregate this data by static policy and time block into database records (or aggregated rows). For example, this aggregation may record outcomes of the download, such as the throughput, download complete time, and time to first byte, as a moving average over 24 hours. A moving average increases the number of data requests (e.g., download requests, network requests, etc.) used to calculate the average statistic, increasing its statistical significance and adds additional data to the adaptive learning system. Aggregated data in each database record also records performance metrics such as percentage improvement in throughput and download complete time of the policy applied in comparison to the bypass traffic.

3. Estimating Parameters Using Adaptive Learning Datasets

Figure 2A:
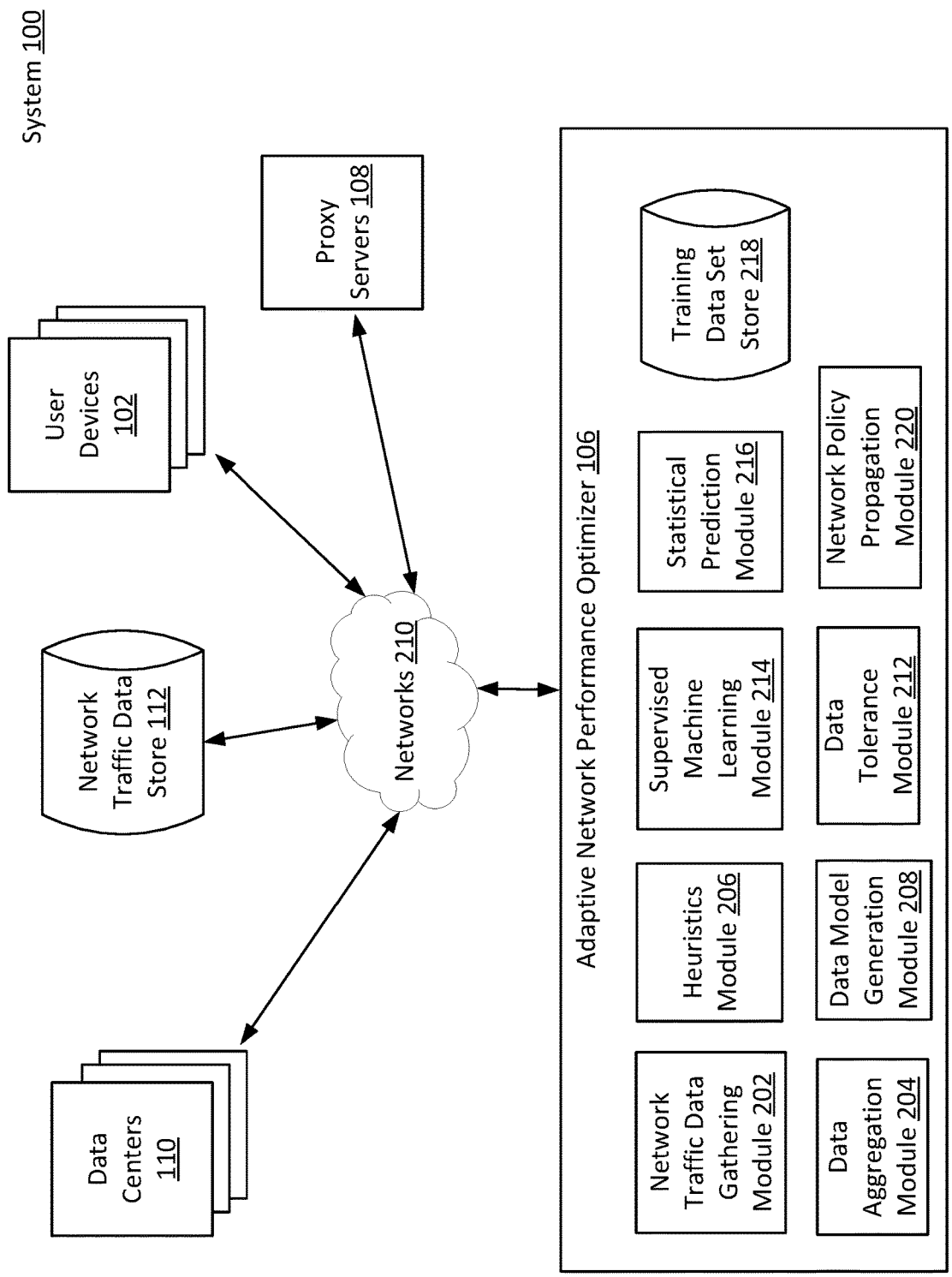
FIG. 2A illustrates a high-level block diagram, including an example adaptive network performance optimizer according to an embodiment of the invention.

FIG. 2A illustrates a high-level block diagram, including an example adaptive network performance optimizer, according to an embodiment. An adaptive network performance optimizer 106 may include a network traffic data gatherer 202, a data aggregator 204, a heuristics engine 206, a data model generator 208, a data tolerance adjustor 212, a supervised machine learning trainer 214, a statistical prediction generator 216, a training data set store 218, and a network policy propagator 220, in one embodiment. The adaptive network performance optimizer 106 may communicate data over one or more networks 210 with other elements of system 100, such as user devices 102, one or more proxy servers 108, data centers 110, and one or more network traffic data stores 112.

A network traffic data gatherer 202 may read, from a network traffic data store 112, one or more network data values associated with data requests between user devices 102 and data centers 110 through one or more proxy servers 108. In one embodiment, a network data value may be gathered by an agent 114 of a user device 102 or from a proxy server 108. The network traffic data gatherer 202 may retrieve network traffic data stored in one or more network traffic data stores 112 by the agent 114 or by the proxy server 108, in an embodiment.

A data aggregator 204 may aggregate data values over a fixed period of time (e.g., a month, a week, a day, etc.) for each combination of static policy and time block into database records (or aggregated rows). A particular combination of static policy and time block may be referred to herein as a control field. Each aggregated row becomes a data point with information on the "goodness" of the network parameters (or the TCP parameters) used. Further, the distribution of control field values in this data set is representative of the mobile network traffic that is aimed for optimization. Every network parameter (or every TCP parameter) can be modeled as an inverse problem: a function of the download outcomes. For example, a moving average of the download complete time values for a particular combination of a static policy and a time block may be identified as the lowest (e.g., the fastest, etc.) download complete time across all time blocks. As a result, the particular combination of static policy and time block may be a good estimate of the best value for the network parameter (or the TCP parameter). This good estimate of the best value for the network parameter (or the TCP parameter) may be used as a set of data points on which a machine may be trained in a "supervised" way, further described below as supervised learning method 400, in one embodiment.

A heuristics engine 206 may incorporate knowledge known to administrators of the adaptive network performance optimizer 106. A heuristic is a technique, method, or set of rules designed for solving a problem more quickly when classic methods are too slow, or for finding an approximate solution when classic methods fail to find any exact solution. Here, the heuristics engine 206 may incorporate knowledge known to the designers of the supervised learning method and techniques described herein to estimate network parameters (or TCP parameters), such as supervised learning method 400 below. For example, a particular carrier, such as AT&T, may have a maximum throughput of 50 MB/sec based on historical data. Thus, a transmission rate, a particular network parameter (or a particular TCP parameter), may be throttled to a range of 20 to 30 MB/sec to ensure faster transmission and minimize the risk of packet loss.

A data model generator 208 may generate one or more data models to estimate network parameters (or TCP parameters) as described above. Given the possibility of network changes over time and the deterministic nature of identifying optimal network parameter values (or optimal TCP parameter values) using static policies and time blocks, the data model generator 208 may be used to identify an iterative process for a supervised learning algorithm, or method 400, to train a machine to achieve desired outputs. Here, the estimation of the best value of a single (network or TCP) parameter given the control fields using the performance information in the data points follows a two-step Bayesian learning algorithm. First, the estimation of the best value is based on a generative module where the parameter is an inverse function of the download outcomes such as throughput, time to first byte, and download complete time. A prediction algorithm is used to estimate the optimal value of this parameter. In order to estimate a value close to optimum that works well in practice, the data points are weighted by a function of their performance information and the traffic share associated with the particular aggregation. In this way, a set of data points may be generated to train the machine as a result of the supervised learning algorithm, or method 400.

After the best value of a single parameter is estimated based on a data model generated by the data model generator 208, the posteriori probability of good performance is measured conditioned on the parameter estimate and other TCP and network parameters. For example, if the posteriori probability is high, the optimizer 106 may then choose this policy for use on future network traffic. This probability is estimated using information from other estimated or set network parameters (or other estimated or set TCP parameters) hence taking into account possible dependencies using a statistical prediction generator 216, for example. For multiple parameter estimation, this process is either parallelized if the parameters are independent in probability distribution or the estimation of the parameters is performed in cascade (e.g., ordered by respective sensitivity of the parameters to download outcomes, etc.) if independence cannot be determined. A supervised machine learning trainer 214 may iterate this two-step Bayesian learning algorithm using the generated datasets described above, stored in a training data set store 218.

A data tolerance adjustor 212 may ensure that an estimated parameter falls within a particular tolerance based on the type of parameter. For discrete network parameter values (or TCP parameter values), such as number of simultaneous network connections, the tolerance may be zero (0), for example. For continuous network parameter values (or TCP parameter values), such as rate of transmission, the tolerance may be 10%, for example, in comparison with a black box optimization algorithm developed to retrieve network parameters (or TCP parameters) which maximized performance based on calculation of network statistics. The objective function of the black box optimization is a function of performance improvement in throughput and download complete time, network congestion, and other network parameters. The optimization is constrained on thresholds for performance improvement metrics and traffic share. The black box algorithm outputs a set of network parameters (or TCP parameters) which optimizes the objective function subject to the constraints. The algorithm operates on data aggregated over some period of time (e.g., a few days, etc.) and has no memory in the choice of statistics used to calculate this objective function and is purely deterministic.

In order to constrain the parameter space and generate relevant data sets to train the data model on, the black box algorithm and the generation of static policies may be used in tandem by a supervised machine learning trainer 214 over multiple (e.g., learning, etc.) iterations. This gives the learning framework its adaptive nature. The static policies ensure that the adaptive learning framework explores the entire network parameter space (the entire TCP parameter space) and does not lead to focusing on local optima. The black box optimization algorithm guides the learning framework to focus on parts of the parameter space where performance improvements are likely to result. Because the learning algorithm has memory and is used in tandem with the above elements, the network parameter estimates (or TCP parameter estimates) have achieved a tradeoff between maximizing performance improvement over bypass traffic and generating stable estimates that do not fluctuate with short term network fluctuations, while enabling estimates to evolve over time.

A statistical prediction generator 216 may be used to generate calculations used in statistical prediction, including probability distributions, Bayesian probability, moving averages, regression analysis, predictive modeling, and other statistical computations. A training data set store 218 may be used to store training set data for generated data models, as described above. The training data set store 218 may include a subset of data stored on the network traffic data store 112, in one embodiment.

A network policy propagator 220 may deliver a network policy to user devices 102 and/or proxy servers 108. A network policy may be chosen based on the above described techniques and may be propagated by configuring a network interface on the user device 102 through an agent 114 or configuring network traffic management on a proxy server 108 through an accelerator 116, in an embodiment. In other embodiments, the network policy propagator 220 may send instructions to a user device 102 or a proxy server 108 on how to implement the chosen network policy based on the estimated network (or TCP) parameter.

4. Monitoring Optimization Framework

A network policy optimization system as described herein can be used to solve network optimization problems for computer applications including but not limited to mobile apps which user devices interact through wireless or cellular data connections. In addition, the system can adaptively and automatically (or autonomously) update or evolve network strategies that are to be recommended in response to (e.g., real time, near real time, delayed by a relatively short time period, etc.) changes in actual network quality experienced by user devices, computer applications, and so forth.

Performance monitoring techniques as described herein can be used to monitor and ensure the successful working of the system over time, determine whether the system is recommending network or TCP strategies for data requests that are performing better than other data requests associated with network or TCP strategies that are not optimized, and take remedial measures and implement adjustments if it is determined that the system is generating conflicting optimization strategies or if it is determined that the system is not performing better in accelerated data requests/downloads than non-accelerated data requests/downloads. Thus, these techniques can be used to monitor (e.g., real time, near real time, delayed by a relatively short time period, etc.) health conditions of an optimization framework implemented in the system, and determine whether the framework behaves or operates as per its design.

By way of illustration but not limitation, the optimization framework to be monitored comprises a Bayesian optimizer (e.g., 236 of FIG. 2B, etc.) that implements predictive modeling of network or TCP parameters based on a generative model to estimate optimal values of the network or TCP parameters, as well as a best parameter generator (e.g., 238 of FIG. 2B, etc.) that searches for best parameter values for a set of network or TCP parameters by optimizing (e.g., minimizing, etc.) an objective function measuring network performance.

The generative model used by a Bayesian learning method/algorithm executed by the Bayesian optimizer represents each network or TCP parameter as an inverse function of the download outcomes.

The object function used by the best parameter generator to search for the best parameter values comprises a combination of parameters such as performance metrics of download outcomes, packet loss, timeouts and so forth. The optimization of the objective function represents a combinatorial search across combinations of candidate parameter values based on the performance metrics generated for one or more time blocks, and is greedy in nature. The network optimization system can guide, steer and/or accelerate data requests to use estimated optimal values generated by the Bayesian optimizer that are similar to the best parameter values generated by the best parameter generator under the greedy optimization, and increase traffic shares of data downloads that use the estimated optimal values for the network or TCP parameters. Based at least in part on the best parameter values generated under the greedy optimization, the system can also monitor the health conditions of the network optimization framework.

The network optimization system can generate and accumulate a plurality of sets of estimated optimal values for network or TCP parameters as generated by the Bayesian optimizer and a plurality of sets of best parameter values for the network or TCP parameters as generated by the best parameter generator, for example over a relatively long stretch of time such as multiple days, multiple weeks, multiple months, multiple years, etc.

An optimization monitor (e.g., 248 of FIG. 2B, etc.) in the system can determine whether the network optimization framework—comprising the Bayesian optimizer and the best parameter generator—are operating as expected at a given time point by determining whether estimated optimal values from the Bayesian optimizer over a (e.g., most recent, etc.) time period up to the given time point converge to best parameter values from the best parameter generator over the same time period.

More specifically, th optimization monitor can look back in time and identify a total number N of iterations of optimizations performed by the system over the time period, which may comprise a first total number $N_1$ of optimizations performed by the Bayesian optimizer and a second total number $N_2$ of optimizations performed by the best parameter generator.

In some embodiments, one or more optimal values for one or more network or TCP parameters, as generated in an iteration of optimization performed by the Bayesian optimizer, may be represented by, or stored in, one or more vector components of a network parameter vector denoted as m. Thus, over the time period, the first total number $N_1$ of iterations of optimizations performed by the Bayesian optimizer generate estimated optimal values for the one or more network or TCP parameters that can be represented by, or stored in vector components of, the first total number $N_1$ of network parameter vectors, denoted as $m_1, m_2, \ldots, m_{N_1}$.

Likewise, in some embodiments, one or more best parameter values for the one or more network or TCP parameters, as generated in an iteration of optimization performed by the best parameter generator, may be represented by, or stored in, one or more vector components of a network parameter vector denoted as b. Thus, over the time period, the second total number $N_2$ of iterations of optimizations performed by the best parameter generator generate best parameter values for the one or more network or TCP parameters that can be represented by, or stored in vector components of, the second total number $N_2$ of network parameter vectors, denoted as $b_1, b_2, \ldots, b_{N_2}$.

In some embodiments, the network optimization framework can be classified as "healthy" if there exists a network parameter vector $m \in \{m_1, m_2, \ldots, m_{N_1}\}$ such that there is a non-empty intersection (denoted as $m \cap \{b_1, b_2, \ldots, b_{N_2}\} \neq \emptyset$) between estimated optimal values in the network parameter vector m and best parameter values in the set of second network parameter vectors $\{b_1, b_2, \ldots, b_{N_2}\}$.

In various embodiments, the network parameter vector m may be (e.g., selected as, randomly chosen, etc.) one of: the most recently generated network parameter vector by the Bayesian optimizer; one of the three most recently generated network parameter vectors by the Bayesian optimizer; any network parameter vector in the set $(m_1, m_2, \ldots, m_{N_1}$ as generated by the Bayesian optimizer in the time period; etc.

In various embodiments, the optimization monitor can determine the non-empty intersection between the estimated optimal values in the network parameter vector m and the best parameter values in the set of second network parameter vectors $\{b_1, b_2, \ldots, b_{N_2}\}$ based on any in various combinations of one or more optimization convergence criteria.

For example, the optimization monitor can determine whether a first optimization convergence criterion is met or satisfied by determining whether the estimated optimal values in the network parameter vector in "match" the best parameter values in any network parameter vector $b \in \{b_1, b_2, \ldots, b_{N_2}\}$. The optimization monitor can determine that there is a non-empty intersection between the estimated optimal values in the network parameter vector m and the best parameter values in the set of second network parameter vectors $\{b_1, b_2, \ldots, b_{N_2}\}$ in response to determining that the estimated optimal values in the network parameter vector in match the best parameter values in any network parameter vector b∈{$b_1, b_2, \ldots, b_{N_2}$} (or in response to determining that the first optimization convergence criterion is satisfied).

As used herein, the estimated optimal values in the network parameter vector m "match" the best parameter values in the network parameter vector b if each estimated optimal value of the estimated optimal values for a respective network or TCP parameter of the one or more network or TCP parameters equals a corresponding best parameter value of the best parameter values for the same network or TCP parameter, subject to a tolerance range that may be set forth specifically for the network or TCP parameter.

The tolerance range may be zero (which implies exact match in values), or non-zero (which implies a match in values within the non-zero tolerance range). In an example, for a first network or TCP parameter that takes sparse values or selections (e.g., 200 milliseconds or 500 milliseconds for a timeout, etc.) in a finite set of values or selections, a tolerance range set forth specifically for the first network or TCP parameter may be zero, meaning an exact match in value is needed. In another example, for a second network or TCP parameter that takes contiguous values (e.g., 500 to 3500 bytes for the maximum number of bytes to be transmitted at a time, etc.) in a relatively large set of contiguous values or in the entire integer spectrum/space of all 16-bit or 32-bit integers, a tolerance range set forth specifically for the network or TCP parameter may be non-zero, meaning an exact match in value is not needed but rather a match is found so long as the values under comparison differ within the non-zero tolerance range.

Additionally, optionally or alternatively, the optimization monitor can determine whether a second optimization convergence criterion is met or satisfied by determining whether the estimated optimal values in the network parameter vector m "fall within statistics" of the best parameter values in the set {$b_1, b_2, \ldots, b_{N_2}$}. As used herein, a "statistic" may refer to an aggregated value, a group value, a maximum, a minimum, a median, a mean, a mode, a 5% minimum, a 95% maximum, etc., in a distribution of estimated optimal values for a given network or TCP parameter.

The optimization monitor can determine that there is a non-empty intersection between the estimated optimal values in the network parameter vector m and the best parameter values in the set of second network parameter vectors {$b_1, b_2, \ldots, b_{N_2}$} in response to determining that the estimated optimal values in the network parameter vector m fall within statistics of the best parameter values in the set b∈{$b_1, b_2, \ldots, b_N$} or (in response to determining that the second optimization convergence criterion is met or satisfied).

As used herein, the estimated optimal values in the network parameter vector m "falls within statistics" of the best parameter values in the set {$b_1, b_2, \ldots, b_{N_2}$} if each estimated optimal value of the estimated optimal values for a respective network or TCP parameter of the one or more network or TCP parameters "falls with statistics" of corresponding best parameter values of the best parameter values in the set b∈{$b_1, b_2, \ldots, b_{N_2}$} for the same network or TCP parameter. The statistics may be represented by one or more statistical values such as maximum, minimum, mean, deviation, histogram, and so forth.

In a non-limiting example, a value falls within statistics of a set of values if the value is between the minimum and maximum values in the set of values. In another non-limiting example, a value falls within statistics of a set of values if the value approximates the mean in the set of values within a deviation or a tolerance range.

These and other variations may be used to determine whether a value (e.g., an estimated optimal value for a network or TCP parameter, etc.) "falls within statistics" of a set of values (e.g., a set of best parameter values for the same network or TCP parameter, etc.). For example, in some embodiments, the optimization monitor may determine that a value "falls within statistics" of a set of values if the value is between 5-percentile and 95-percentile values in a distribution of values represented in the set of values. Hence, in some embodiments, statistical outliers in the set of values may be prevented from being used for comparison purposes, or for determining whether there is a non-empty intersection, or for determining whether there is a convergence between the set of first network parameter vectors and the set of second network parameter vectors.

In some embodiments, the optimization monitor uses the same combination of optimization convergence criteria and/or the same types of statistics for determining whether the estimated optimal values of the network parameter vector m have a non-empty intersection with the best parameter values of the set {$b_1, b_2, \ldots, b_N$}. However, in general, in various embodiments, there is no need to use the same combination of optimization convergence criteria or even the same types of statistics for determining whether the estimated optimal values of the network parameter vector m have a non-empty intersection with the best parameter values of the set {$b_1, b_2, \ldots, b_{N_2}$}.

In some embodiments, in response to determining that the estimated optimal values of the network parameter vector m have a non-empty intersection with the best parameter values of the set {$b_1, b_2, \ldots, b_{N_2}$}, the optimization monitor determines that network or TCP strategies represented by the estimated optimal values generated by the Bayesian optimizer converge to, or are deemed similar to, network or TCP strategies represented by the best parameter values generated by the best parameter generator, given the current network quality or the network traffic data embodying the current network quality.

A determination that the network or TCP strategies generated by the Bayesian optimizer converge to, or are deemed similar to, the network or TCP strategies generated by the best parameter generator can be used by the network optimization system to ensure or guide that a machine learning framework such as the Bayesian optimizer is picking or estimating optimal values for the network or TCP parameters that can best improve application performance, network quality and end user experience.

In some embodiments, performance of the machine learning framework used to generate optimized network strategies/policies can be measured, for example, by the system implementing the framework and the optimization monitor.

The system may collect raw accelerated network traffic data for data requests/downloads that use estimated optimal values for the network or TCP parameters in the optimized network strategies/policies, for example from proxy servers (e.g., 108 of FIG. 1, etc.). The system can generate accelerated network traffic data from the raw accelerated network traffic data.

The system may collect raw accelerated network traffic data for data requests/downloads that use estimated optimal values for the network or TCP parameters in the optimized network strategies/policies, for example from proxy servers (e.g., 108 of FIG. 1, etc.). The system can generate accelerated network traffic data from the raw accelerated network traffic data.

The system, or the optimization monitor therein, can measure performance, or improvement thereof, with respect to a download outcome by determining a difference (e.g., percentage difference, etc.), in an aggregate statistic between the accelerated and bypass samples or data records in the accelerated network traffic data and the static policy data corresponding to the (e.g., same, etc.) conditions specified, such as computer application name, geography, network type, access server network, device, other network or TCP parameters, content parameters, and so forth. A variety of aggregate statistics may be used in various embodiments. In a non-limiting embodiment, the median may be selected as the aggregate statistic to measure the performance, or the improvement thereof. Thus, the median of a performance metric derived from accelerated network traffic data may be compared with the medium of the same performance metric derived from other network traffic data (e.g., static policy data, bypass data, etc.).

The performance monitor can use performance measurements with respect to one or more download outcomes to monitor or verify whether the machine learning framework is operating or generating optimized network strategies/policies as intended. For example, based on the performance measurements, the optimization monitor can determine whether performance outcomes (e.g., with respect to download outcomes, etc.) of accelerated data requests (or accelerated network requests) are better than their counterparts of non-accelerated data requests such as bypass requests using default network or TCP parameter values. In response to determining that the performance outcomes of the accelerated data requests are better, the system may continue to propagate or maintain optimized network strategies generated by the machine learning framework. Otherwise, the system may discontinue or adaptively modify/monitor/determine whether optimized network strategies generated by the machine learning framework should be propagated for handling data requests/downloads between user devices and computer applications.

Additionally, optionally or alternatively, in some embodiments, expert input representing domain expertise and intuition may be used by the system, or a parameter explorer (e.g., 230 of FIG. 2B, etc.) therein, to sample a parameter space of (e.g., all, etc.) different combinations of network or TCP parameter values or a polytope constructed based on the expert input in the parameter space. Example expert input for network optimization is described in U.S. patent application Ser. No. 15/803,557, with an application title of "INCORPORATION OF EXPERT KNOWLEDGE INTO MACHINE LEARNING BASED WIRELESS OPTIMIZATION FRAMEWORK," by Tejaswini Ganapathi, Satish Raghunath, Shauli Gal, filed Nov. 3, 2017, the entire contents of which are hereby incorporated by reference in its entirety for all purposes, the entire contents of which are hereby incorporated by reference in its entirety for all purposes.

Static policies generated based on the sampling of network or TCP parameters based on the expert input may be propagated to handle data requests/downloads between user devices and computer applications (e.g., mobile apps, etc.). Network traffic data can be collected for these static policies comprising network or TCP parameter values based on the expert input. The system can determine whether performance/download outcomes of network or TCP strategies generated by the Bayesian optimizer and the best parameter generator are better than that of the static policies generated based on the expert input by the parameter explorer. In response to determining that the performance outcomes of the accelerated data requests are better in one or both determinations, the system may continue to propagate or maintain optimized network strategies generated by the machine learning framework. Otherwise, the system may discontinue or adaptively modify/monitor/determine whether optimized network strategies generated by the machine learning framework should be propagated for handling data requests/downloads between user devices and computer applications. This ensures that the machine learning framework is a) doing better than network strategies/policies that are randomly distributed in the parameter space or the polytope thereof, and/or b) doing better than network strategies/policies set up based on the expert input (e.g., domain knowledge, expert intuition, etc.).

In some embodiments, health, operation, and performance monitoring of the machine learning framework is automated in the system. In some embodiments, such monitoring is performed repeatedly, for example, periodically or on demand. In some embodiments, the time period from which the optimization iterations are selected for monitoring purposes represent a continuously running time period in real time, in near real time, or with a delay in time. In some embodiments, some or all of controls, statuses, results, determinations, recommendations, actions, and so forth, in connection with the health, operation, and performance monitoring of the machine learning framework can be displayed or inputted in user interface (e.g., dashboard, etc.) or command line interface.

5. Example Network Optimization System

The estimation of network or TCP parameters can be modeled as an inverse problem. Conceptually, download outcomes of data requests are functions of network or TCP parameters as the network or TCP parameters affect the download outcomes, subject to the following data request related variables or factors:
  Network variables such as IP, latency, round trip time, carrier, autonomous system number, CDN, etc.
  Location parameters such as server location, geography, time zone, timestamp, etc.
  Content parameters such as content type, content/file size, URL schema, http vs https, etc.
  Device parameters such as phone type, OS, etc.

A particular combination of values for some or all of these variables or factors may represent a particular profile shared by a particular subset of data request (or a particular data request segment) in a data request space or shared by particular user devices or particular end users who make the particular subset of data requests. A plurality of profiles related to a plurality of subsets of data requests may be tracked or captured along with download outcomes of the data requests by values of data request related fields in matrix rows of a data matrix as described herein.

The data matrix may be generated per learning iteration from network traffic data collected from live traffic or synthetic traffic. Examples of represented fields in the data matrix may include, but are not necessarily limited to only, any of: autonomous system number (ASN), carrier, time zone, phone operating system (OS), and other variables that are a function of networks and device, geography, network type (e.g., Wi-Fi, cellular, 3G, 4G, LTE, AT&T, Verizon, T-Mobile, Sprint, etc.), computer application (e.g., mobile application name or type, computer application name or type, etc.), etc.

A matrix row of the data matrix comprises: a specific combination of values for the data request related fields (e.g., network, location, content variables, device variables, etc.); a specific network or TCP strategy/policy (e.g., a specific static policy, etc.) comprising a specific set of network or TCP parameters that were applied for data requests giving rise to the matrix row; download outcomes; performance improvement (e.g., percentile improvement, etc.) of each of the download outcomes as compared with a baseline such as download outcomes of default network or TCP parameter values captured in bypass data of the historical data; etc.

As used herein, a data request space refers to a space (e.g., a data matrix space, etc.) of all possible/available values of all (data request related) fields represented in matrix rows of the data matrix. A data request segment refers to a data segment or a subdivision—of the data request space—representing all (e.g., possible, logged, to be processed, etc.) data requests that share the same values for some or all fields represented in matrix rows of the data matrix.

Data request segments in the data request space can be identified as scopes and/or sub scopes. A data request scope (or "scope" for simplicity) refers to a data request segment indexed or parameterized by a set of scope-level fields (or factors) selected from the represented fields in the data matrix. A data request sub scope (or "sub scope" for simplicity) refers to a data request segment that is a subdivision of a scope. The sub scope may be indexed or parameterized by the set of scope level fields plus at least one additional (sub-scope-level) field (or factor)—which is selected from the represented fields in the data matrix—other than the scope-level fields.

Scopes and/or sub scopes can be identified iteratively over each of multiple time blocks (e.g., running time blocks, etc.). Example time blocks may include but are not necessarily limited to, every two to six hours, every n number of hours, every day, every fraction of a day, every week, every fraction of a week, etc. An optimized network policy for an identified scope and/or sub scope can be generated/outputted as a specific machine learning solution for the scope and/or sub scope.

A machine learning system as described herein can use the download outcomes in historical data (e.g., network traffic data, matrix rows of a data matrix, etc.) to reverse engineer the optimal value of each network TCP parameter for each of some or all data request segments taking into account specific values for data request related fields (e.g., network, location, content variables, device variables, etc.) corresponding to each such data request segment. Each such data request segment may be a scope characterized by a particular combination of values for scope-level data request related fields such as {app, geography, network type}, or a sub scope further characterized by values for sub-scope-level data request related fields.

The machine learning system can vary data models or generative models used for the predictive modeling of network or TCP parameters, and select the model that generates the network strategy demonstrating the best improvement in computer application performance in historical data. The selected data model or generative model used for the predictive modeling of the network or TCP parameters can be applied to estimating optimal values for the network or TCP parameters with respect to any number of download outcomes. The predictive modeling can be performed by a Bayesian optimizer that trains on collected data in matrix rows in the data request segment that show performance improvements over baseline performance generated by default network policies. The estimated optimal values can be applied to future data requests to improve computer application (e.g., mobile app, etc.) performance and end user experience. For example, the estimated optimal values for network or TCP parameters can be simultaneously used by a user device to improve one or more download outcomes such as: download complete time, speed throughput, time to download first byte, time to make/establish a connection, and so forth.

Example network or TCP parameters for which optimal values can be estimated under techniques as described herein may include, but are not necessarily limited to only, any of: total numbers of concurrent connections, timeouts, maximum bytes to be transmitted at a time, etc. In addition, techniques as described herein are readily extensible to estimating optimal values for newly added network or TCP parameters, and/or to improving newly added download outcomes or objectives.

In some embodiments, different optimal network or TCP strategies/policies may be generated for different data request segments in a data request space representing all possible data requests. Example methods of optimizing data delivery for data request segments such as scopes and sub scopes are described in U.S. patent application Ser. No. 15/803,624, with an application title of "DYNAMIC SEGMENT GENERATION FOR DATA-DRIVEN NETWORK OPTIMIZATIONS," by Tejaswini Ganapathi, Satish Raghunath, Shauli Gal, Kartikeya Chandrayana and Steve Wilburn, filed Nov. 3, 2017, the entire contents of which are hereby incorporated by reference in its entirety for all purposes.

A machine learning framework as described herein can take into account a number of considerations at every learning iteration as follows:

1. Network quality changes with time: The machine learning framework and methods/algorithms/data models chosen can adapt to changes in network quality, which can be caused by a number of time-varying factors such as high traffic, network congestion, carrier, and other factors not visible to end users and application servers that provide application services to the end users.
2. Non-stationarity of probability distribution functions of download outcomes: As network quality changes, distributions or histograms of the download outcomes can also change. Hence changing the choice of optimization method/algorithm/data model used to estimate the network or TCP parameters can be dynamically adapted or changed to take into account changes in the distributions or histograms of the download outcomes.

For example, one or more optimization methods/algorithms (and one or more data models used by the optimization methods/algorithms) can be used to generate or estimate individual optimal values for the network or TCP parameters with respect to the download outcomes. The method/algorithm that generates the best strategies or optimal values for these network or TCP parameters may be identified from the optimization methods/algorithms based on past optimization performance data. The past optimization performance data can be collected and used to determine how well estimated parameter values generated from the models match actual best performing parameter values in the network traffic data, how well estimated parameter values generated from the optimization methods/algorithms improve performance on download outcomes, etc. An individual optimization performance score can be computed based on the past optimization performance data, and used to track the optimization performance of each of the optimization methods/algorithms. The method/algorithm that shows the highest performance improvement or has the highest optimization performance score may be identified as the best method/algorithm among the optimization methods/algorithms to generate the overall optimized network or TCP policy/strategy.

Example machine learning frameworks are described in U.S. patent application Ser. No. 15/803,614, with an application title of "SIMULTANEOUS OPTIMIZATION OF MULTIPLE TCP PARAMETERS TO IMPROVE DOWNLOAD OUTCOMES FOR NETWORK-BASED MOBILE APPLICATIONS," by Tejaswini Ganapathi, Satish Raghunath, Kartikeya Chandrayana and Shauli Gal, filed Nov. 3, 2017, the entire contents of which are hereby incorporated by reference in its entirety for all purposes, the entire contents of which are hereby incorporated by reference in its entirety for all purposes.

Figure 2B:
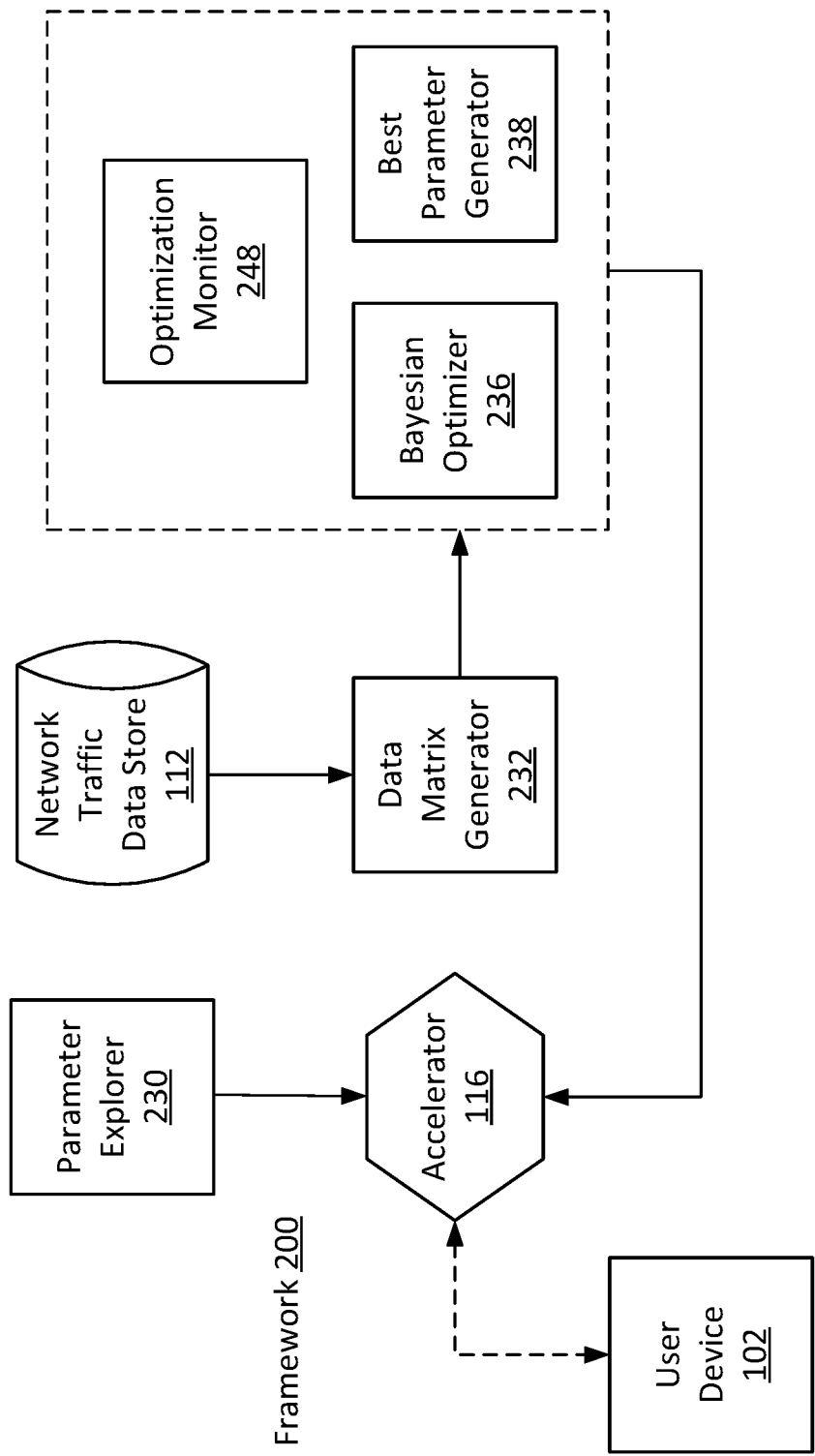
FIG. 2B illustrates a high-level block diagram, including an example adaptive network policy generation framework with an optimization health monitor, according to an embodiment.

FIG. 2B illustrates a high-level block diagram, including an example adaptive network policy generation framework with an optimization health monitor, according to an embodiment. An adaptive network policy generation framework 200 may be implemented by one or more computing devices including but not necessarily limited to the adaptive network performance optimizer 106 of FIG. 1 or FIG. 2A. As illustrated in FIG. 2B, the adaptive network policy generation framework 200 may include a parameter explorer 230, an accelerator 116, a network traffic data store 112, a data matrix generator 232, an optimization health monitor 248, a Bayesian optimizer 236, a best parameter generator 238, etc.

Any of these elements in the framework 200 may have a single running instance, or multiple running instances, and may communicate data over one or more networks 210 with other elements of framework 200 and/or system 100, such as user devices 102, one or more proxy servers 108, data centers 110, and so forth.

To collect network traffic data to be used for optimizing network parameters that may be included in customized network policies, the parameter explorer 230 may generate a plurality of static policies that comprises a plurality of sets of (e.g., sampled, static, etc.) network parameter values. Each static policy in the plurality of static policies may comprise a respective set of network parameter values in the plurality of sets of network parameter values. In some embodiments, the plurality of sets of network parameter values may be selected/sampled, for example uniformly, from a polytope in the possible parameter space of the network parameters. The polytope represents a subset of possible parameter values in the possible parameter space, for example determined based at least in part on expert input representing domain expertise and intuition. The plurality of static policies, or the corresponding plurality of sets of network parameter values, may be propagated by the accelerator 116 (which may be deployed at a point relatively close to user devices or a portion thereof) to be used by user devices (e.g., 102, etc.) in making data requests (e.g., network requests, download requests, etc.), which are in a data request segment such as a scope or a sub scope in a data request space and share a common set of data request related fields such as application, geography, network type, and so forth.

Over a time block (e.g., every four hours, every five hours, every n unit of time, a variable number of hours etc.), data requests respectively assigned with different sets of static policies in the plurality of static policies—or different sets of network parameter values in the plurality of sets of network parameter values—can be used to generate static policy data that comprises a plurality of static policy data portions for the plurality of sets of network parameter values. The static policy data may be in the network traffic data store 112. Bypass traffic data may also be generated with default network or TCP parameters (e.g., of the carrier, etc.) and stored in the network traffic data store 112.

The data matrix generator 232 may retrieve the static policy data and the bypass traffic data from the network traffic data store 112, and use the static policy data and the bypass traffic data to generate a data matrix. The data matrix comprises a plurality of matrix rows that may be used to adaptively identify scopes and/or sub scopes.

A matrix row represents a database record or an aggregated row comprising data field values directly or indirectly derived from raw network traffic data. Each matrix row in the data matrix may be a database record or an aggregated row comprising a plurality of values (for a plurality of fields) directly aggregated from raw network traffic data that logs data requests made by user devices (e.g., 102, etc.) to application servers or data centers (e.g., 110, etc.). Additionally, optionally or alternatively, each matrix row in the data matrix may be a further consolidated database record comprising a plurality of values (for a plurality of fields) aggregated from database records (or aggregated rows) that in turn are generated/aggregated from the raw network traffic data.

Each matrix row in the data matrix may comprise fields storing a respective (e.g., distinct, unique, etc.) combination of (field) values for a combination of scope-level fields. Each such matrix row in the data matrix may comprise fields storing a respective (e.g., distinct, unique, etc.) combination of (field) values for a combination of sub-scope-level fields. There may or may not exist a hard limit (e.g., 2, 5, 10, 20, etc.) for a total number of different sub-scope-level fields to be captured in each matrix row.

Each matrix row in the data matrix may store a traffic share value (e.g., an absolute value, a relatively value, a percentile value, etc.) for a respective (e.g., distinct, unique, etc.) combination of values for a combination of scope-level fields and sub-scope-level fields represented in the matrix row.

Each matrix row in the data matrix may comprise (e.g., aggregated, average, etc.) performance metrics of comparing the static policy data against the bypass traffic data with respect to one or more data requests that share a respective (e.g., distinct, unique, etc.) combination of (field) values for the combination of sub-scope-level fields represented in each such matrix row. For example, fields representing download outcomes such as throughput, download complete time, time to download the first byte, and so forth, may be captured in each matrix row in the data matrix. Each such matrix row may also comprise (e.g., static, sampled, etc.) network parameter values used to make data request(s).

A learning framework comprising the Bayesian optimizer 236, the best parameter generator 238, and so forth, can implement and perform an iterative supervised learning process to estimate optimal values of the network or TCP parameters.

At each learning iteration, the Bayesian optimizer 236 estimates the best value for a network or TCP parameter based on a generative module where the parameter is an inverse function of the download outcomes such as throughput, time to first byte, and download complete time. The best parameter generator 238 may implement a black box optimization algorithm based on an objective function of performance improvement in throughput and download complete time, network congestion, and other network parameters. The back box algorithm may be performed less often than the Bayesian prediction/estimation performed by the Bayesian optimizer 236. The black box algorithm outputs a set of network or TCP parameter values which optimize the objective function (e.g., minimize a loss function or a cost function, etc.) subject to constraints. For example, the back box algorithm may be performed based on network traffic data underlying one or more data matrixes for one or more time blocks, based on one or more sets of network traffic data used by one or more learning iterations of the Bayesian optimizer 236, etc. The output of the black box algorithm may be used in one or more learning iterations to guide the learning framework to focus on parts of the parameter space where performance improvements are likely to result.

For each identified scope and/or each identified sub scope, the learning framework can generate/predict a customized network or TCP strategy to be incorporated by a network or TCP policy for handling new requests that share the same values (or attributes) of the identified scope or sub scope. In some embodiments, such network or TCP strategy may be generated/predicted only under conditions of:
   a) adequate confidence for the strategy as measured/ indicated by a posteriori probability (e.g., above a pre-configured or dynamically configured posteriori probability threshold, etc.) that the strategy leads to a performance gain, and
   b) adequate traffic for the data request segment corresponding to the sub scope, as evidenced or determined based on traffic share information stored in the data matrix.

The generated/predicted network or TCP strategy may be propagated to proxy servers (e.g., 108 of FIG. 1) or accelerators therein (e.g., 116, etc.) to be used for processing/handling new data requests for example in a subsequent time block. Some or all of estimated optimal network or TCP parameter values in the generated/predicted network strategy may be further propagated to user devices (e.g., 102, etc.) to be used for processing the new data requests (e.g., in the next time block).

Subsequent network traffic data may be collected in the subsequent time block and used to generate a subsequent data matrix and matrix rows therein. Subsequent scopes and sub scopes may be identified based at least in part on the subsequent network traffic data and/or the subsequent data matrix. Subsequent customized optimization for the subsequent scopes and sub scopes may be further performed in the same manner as discussed herein.

In the meantime, the optimization health monitor 248 monitors whether the framework comprising the Bayesian optimizer 236 and the best parameter generator 238 operates normally. At any given time point at runtime, the optimization health monitor 248 can determine a time period such as several hours, several days, several weeks, and so forth, for example up to the given time. Based on the time interval, optimization results of N iterations from both the Bayesian optimizer 236 and the best parameter generator 238 can be retrieved. The optimization health monitor 248 represents estimated optimal values over $N_1$ iterations from the Bayesian optimizer 236 in a set of first network parameter vectors. The optimization health monitor 248 represents estimated optimal values over $N_2$ iterations from the best parameter generator 238 in a set of second network parameter vectors. In some embodiments, the optimization health monitor 248 determines whether the framework performs normally at least in part based on determining whether the sets of first and second network parameter vectors converge, further determines whether (e.g., newly generated, etc.) estimated optimal values are to be propagated.

Additionally, optionally or alternatively, the optimization health monitor 248 can collect accelerated network traffic data, for example through user devices, proxy servers, and so forth. Performance data on accelerated data requests/downloads using estimated optimal values from the framework such as Bayesian learning can be generated based on the network traffic data including but not limited to the accelerated network traffic data. The optimization health monitor 248 can determining performance improvement over performance of data requests/downloads using randomly sampled network or TCP values and/or over performance of data requests/downloads using recommended network or TCP values set forth based on expert input representing domain knowledge and intuition. As a result, optimized network or TCP policies/strategies that are propagated to proxy servers, user devices, and so forth, for use in data requests/downloads can be relatively reliable, stable, adaptive but with fewer abrupt fluctuations, and have a relatively high probability to improve application performance, network performance, and end user experience.

6. Convergence on Optimum Network Parameters

Figure 3:
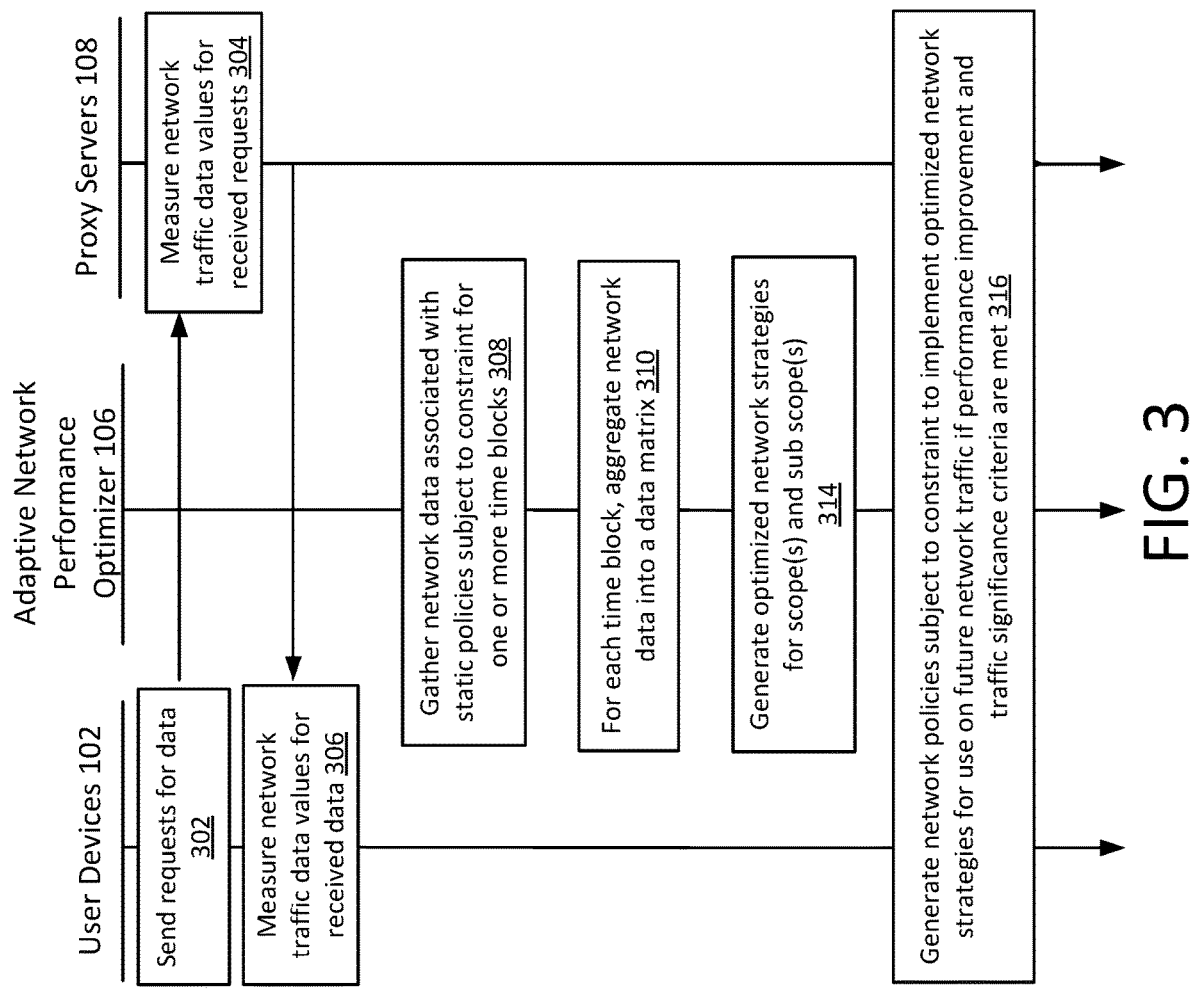
FIG. 3 illustrates a high-level interaction flow diagram of adaptive network policy optimization, according to an embodiment of the invention.

FIG. 3 illustrates a high-level interaction diagram of adaptive network policy optimization, according to an embodiment. User devices 102 may send 302 requests for data to proxy servers 108. In response, proxy servers 108 may measure 304 network traffic data values for received requests. As data is sent from proxy servers 108 to user devices 102, network traffic data values for received data may be measured 306 by user devices 102. Such raw network traffic data values may include download completion time, time to first byte, and throughput, for example.

Network data associated with static policies with parameter values (subject to a constraint to be) within the polytope may be gathered 308 for one or more time blocks. Static policies include randomly assigned or uniformly selected/sampled parameter values retrieved from the range of parameter values in a data request space or a polytope (which may be constructed based at least in part on expert input) therein. Mobile network traffic may then be assigned the static policies and data is gathered 308 by recording the network traffic data in the network traffic data store 112. A time block is a period of time during which the network traffic data is recorded in the network traffic data store 112.

For each static time block, network data values may be aggregated 310 into a data matrix. The network data values are aggregated 310 over a fixed period of time (e.g., the last month, the last week, the last day, etc.). The aggregation records outcomes of the download, such as the throughput, download complete time, and time to first byte, as a moving average over a time block. Performance metrics of policy applied compared to bypass traffic is determined for each static policy and time block, and the performance metrics are stored within each database record. Bypass traffic, as mentioned above, is a subset of traffic that is assigned default network or TCP parameters. In this way, aggregated network data values in a database record provide qualitative information about how well the static policy performed over the bypass traffic. This aggregated data set is stored as training data in the training data set store 218. In addition, the database records including traffic share information may be further aggregated into corresponding matrix rows in the data matrix.

A network or TCP strategy is generated 314 for the given scope and/or sub scope for use on future network traffic if performance improvement and traffic significance criteria are met.

A best value of a parameter may be estimated (subject to a constraint to be) within the polytope based on a weighting of the performance metrics associated with the parameter. A prediction algorithm is used to estimate the optimal value of this parameter. The estimation is based on a generative model where the network or TCP parameter is an inverse function of the download outcomes such as throughput, time to first byte and download complete time. Each database record as mentioned above provides a data point with information on the "goodness" of the network or TCP parameter used. To estimate a value close to optimum that works well in practice, the data points are weighted by a function of their performance information and the traffic share associated with the particular aggregation. Higher performing data points would be weighted more, as well as higher traffic share data points. For example, if it is determined that 25 MB per second transmission rate is high performing compared to bypass traffic, that value may be weighted more heavily than lesser performing data points. In this way, the best value of a parameter may be estimated.

A network or TCP policy as described herein may comprise estimated best parameter values for network or TCP parameters for use on future network traffic. The estimated best parameter values may be determined as matching (with a threshold or margin of tolerance) a calculated value for the parameter by a black box optimization that maximizes performance using network statistics (e.g., over a single or multiple time blocks, etc.). In this way, the approach taken by the learning algorithm is adaptive and multi-phase: phase 1 includes estimating the network or TCP parameters to estimate the best values while phase 2 uses a greedy optimization that promotes the best outcomes given network statistics. Comparing phase 1 and phase 2 may also be defined as generating a model of convergence. In one embodiment, a policy may be determined to fail because the phase 1 and phase 2 parameters do not converge. In a further embodiment, a policy may be determined to fail because a prediction model on the convergence of the phase 1 and phase 2 parameters show less than a specific (e.g., 55%, etc.) likelihood of convergence. In this case, one or more hidden variables may be affecting the policy. For example, file size may be a dominant characteristic that affects a policy that enables throughput of 1 MB to 20 MB. Because file size may vary according to the user device task, such as small file downloads (e.g., web browsing, etc.) versus large file downloads (e.g., video streaming, etc.), file size may be a hidden variable that dominates the policy, causing it to fail. Other hidden variables may include server behavior, user device behavior, and network congestion.

Figure 4A:
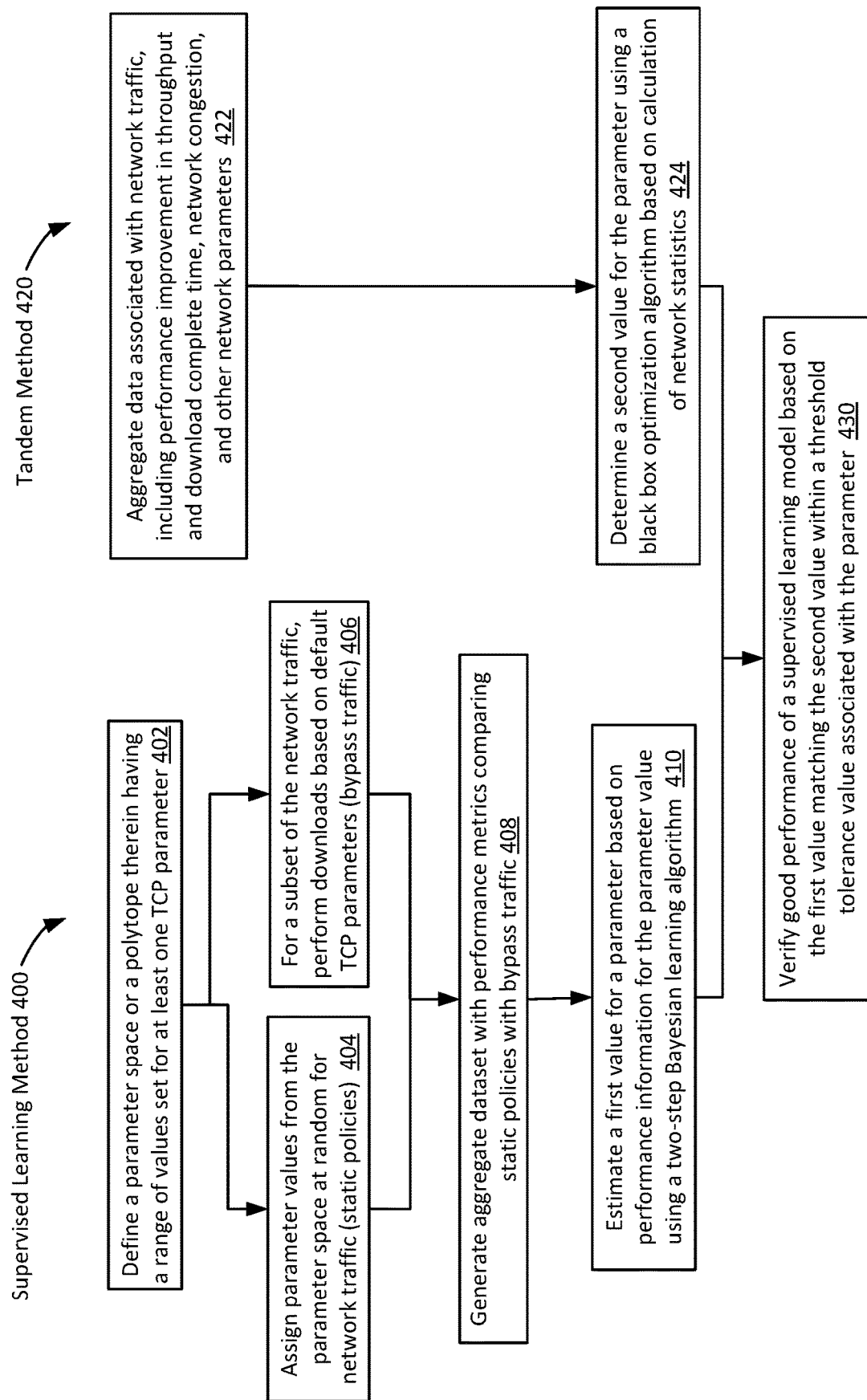
FIG. 4A illustrates a flowchart for adaptive network policy optimization, according to an embodiment of the invention.

FIG. 4A illustrates a flowchart for adaptive network policy optimization, according to an embodiment of the invention. Supervised Learning Method 400, using the supervised machine learning trainer 214 and data model generator 208, among other components in the adaptive network performance optimizer 106 as described above, may be used in adaptive network policy optimization for a scope or a sub scope, in an embodiment. A parameter space having a range of values set for at least one network or TCP parameter or a polytope (e.g., constructed based at least in part on expert input, etc.) therein may be defined 402. This parameter space or the polytope may be defined 402 based on known information and/or heuristics, for example. Parameter values from the parameter space or the polytope may be assigned 404 at random or uniformly for network traffic (static policies). For a subset of the network traffic, downloads may be performed 406 based on default network or TCP parameters (bypass traffic). As mentioned above, raw network traffic data may be gathered over time according to the randomly assigned network or TCP parameters or default network or TCP parameters.

An aggregate dataset may be generated 408 to have performance metrics comparing static policies with bypass traffic. Each data point in the aggregate dataset is an aggregation of the values recorded for a particular combination of network or TCP parameter and time block. Additionally, the distribution of control field values (each combination of network or TCP parameter and time block) in the aggregate data set is representative of the mobile network traffic being optimized due to the method of generation.

A data matrix may be generated based on aggregate datasets or database records that are in turn generated from static policy data and the bypass traffic data. The data matrix may be used to identify scopes and sub scopes for customized optimization.

Every network or TCP parameter to be used by an individual customized strategy specifically optimized for a scope or sub scope may be modeled as an inverse problem: a function of the download outcomes.

A first parameter value for a network or TCP parameter in the individual customized strategy may be estimated 410 based on performance information using a two-step Bayesian learning algorithm. In a tandem method 420, data associated with network traffic, including performance improvement in throughput and download complete time, network congestion, and other network parameters, may be aggregated 422. This data associated with network traffic may be used to determine 424 a second parameter value for the network or TCP parameter using a black box optimization algorithm that maximizes performance based on the calculation of network statistics.

Good performance of a supervised learning algorithm, method 400, or model may be verified 430 based on the first parameter value for the network or TCP parameter matching the second parameter value for the same network or TCP parameter within a threshold tolerance value associated with the network or TCP parameter. Network or TCP parameters may be associated with different threshold tolerance values. For example, a threshold tolerance value for a continuous network or TCP parameter, such as transmission rate, may be 10%, meaning that the first network or TCP parameter value should be within 10% of the second network or TCP parameter value. If the model is not verified 430, the supervised learning method 400 and tandem method 420 may repeat until the model converges.

Characteristics of modern networks change at a very rapid clip. The diversity of devices, content, device types, access mediums, etc., further compound the volatility of the networks. These facets make the problem hard to characterize, estimate or constrain resulting in inefficient, slow and unpredictable delivery of any content over these networks. However, there is a lot of information about the network available in the transit traffic itself—from billions of devices consuming data. This information that describes network operating characteristics and defines efficacy of data delivery strategies is called a "network imprint". The approaches described herein allow embodiments to compute this network imprint. Embodiments include an apparatus comprising a processor and configured to perform any one of the foregoing methods. Embodiments include a computer readable storage medium, storing software instructions, which when executed by one or more processors cause performance of any one of the foregoing methods. Note that, although separate embodiments are discussed herein, any combination of embodiments and/or partial embodiments discussed herein may be combined to form further embodiments.

7. Example Process Flows

Figure 4B:
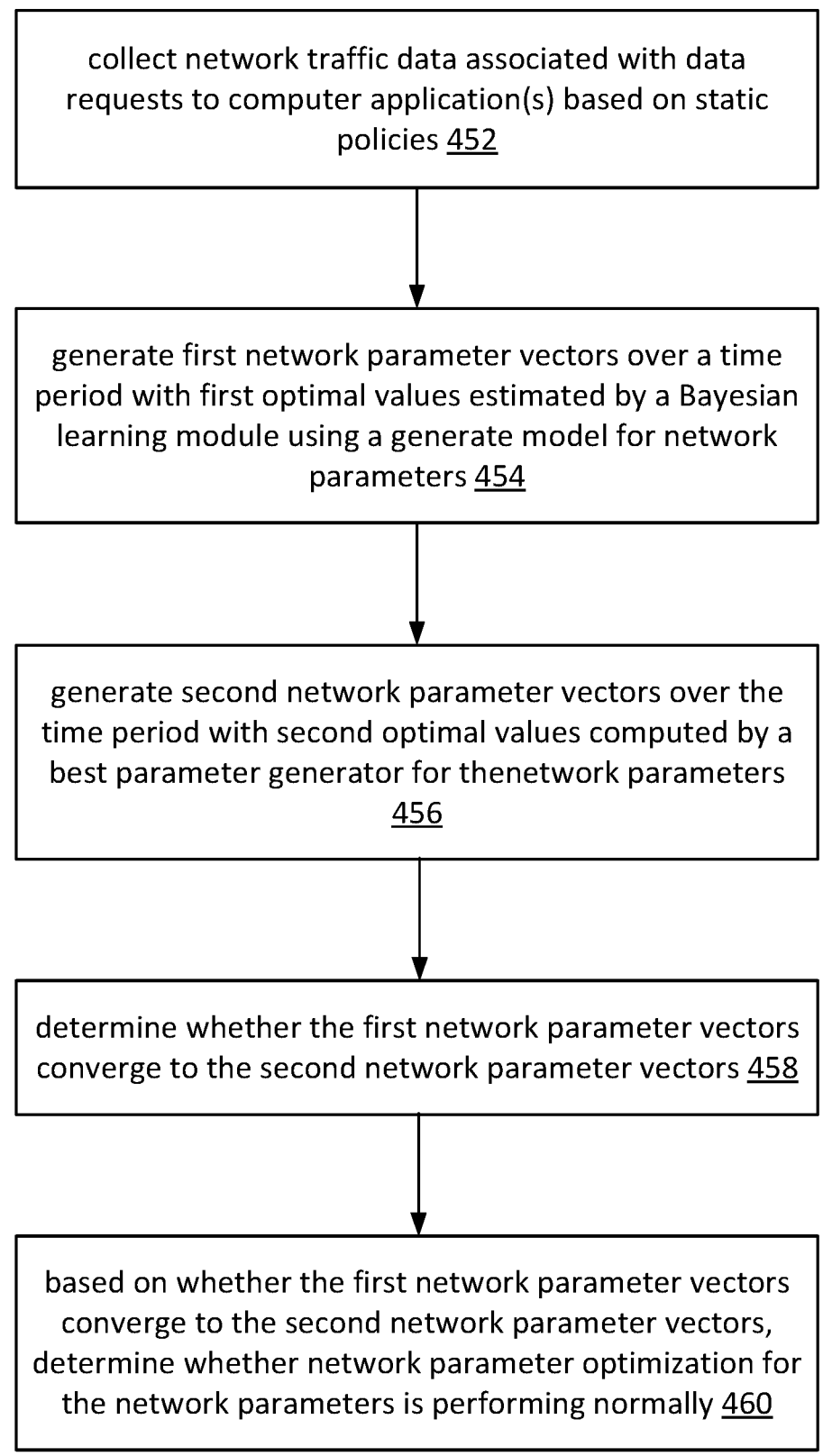
FIG. 4B illustrates a high-level diagram of an optimization health monitoring procedure, according to an embodiment.

FIG. 4B illustrates a high-level diagram of an optimization health monitoring procedure, according to an embodiment. optimization health monitoring procedure may be performed by one or more computing devices including but not necessarily limited to a network optimization system, such as an adaptive network performance optimizer (e.g., 106 of FIG. 1 or FIG. 2A, etc.) with an optimization monitor (e.g., 248 of FIG. 2B, etc.), in one embodiment.

In block 452, the system collects network traffic data associated with a plurality of data requests to one or more computer applications based on a plurality of static policies.

In block 454, the system generates a set of first network parameter vectors over a time period. Each network parameter vector in the set of first network parameter vectors comprises one or more first vector components storing one or more first optimal values, estimated by a Bayesian learning module using a generative model that represents one or more network parameters as one or more inverse functions of download outcomes, for one or more network parameters.

In block 456, the system generates a set of second network parameter vectors over the same time period. Each network parameter vector in the set of second network parameter vectors comprises one or more second vector components storing one or more second optimal values, computed by a best parameter generator through optimizing an objective function measuring network performance based at least in part on the collected network traffic data, for the one or more network parameters.

In block 458, the system determines whether the set of first network parameter vectors converges to the set of second network parameter vectors.

In block 460, based at least in part on determining whether the set of first network parameter vectors converges to the set of second network parameter vectors, the system determines whether network parameter optimization for the one or more network parameters is performing normally.

In an embodiment, the set of first network parameter vectors comprises one or more network parameter vectors each of which comprises one or more optimal values, for the one or more network parameters, that have been propagated to be used in one or more data downloads between one or more user devices and the one or more computer applications; the system is configured to further perform: collecting a network traffic data portion associated with a plurality of accelerated data requests to the one or more computer applications based on a plurality of optimized network policies comprising optimal values in the one or more network parameter vectors in the set of first network parameters; determining, based at least in part on the network traffic data portion, accelerated download outcomes for accelerated data downloads in connection with the plurality of accelerated data requests; etc.

In an embodiment, the system is configured to further perform: determining whether the accelerated download outcomes are better than non-accelerated download outcomes for non-accelerated data downloads in connection with the plurality of data requests.

In an embodiment, the system is configured to further perform: determining whether the accelerated download outcomes are better than baseline download outcomes for baseline data downloads using baseline parameter values for the one or more network parameters.

In an embodiment, one or more most recently estimated network parameter values in the set of first network parameter vectors for the one or more network parameters are propagated to be used in one or more data downloads between one or more user devices and the one or more computer applications, based at least in part on determining that the set of first network parameter vectors converges to the set of second network parameter vectors.

In an embodiment, the set of first network parameter vectors comprises a first total number of network parameter vectors generated by the Bayesian optimizer in the first total number of iterations over the time period; the set of second network parameter vectors comprises a second total number of network parameter vectors generated by the best parameter generators in the second total number of iterations over the time period.

In an embodiment, the first total number of iterations is different from the second total number of iterations. In an embodiment, the first total number of iterations is greater than the second total number of iterations.

In an embodiment, one or more most recently estimated network parameter values in the set of first network parameter vectors for the one or more network parameters are prevented from being propagated to be used by one or more user devices to make one or more new data requests to the one or more computer applications, in response to determining that the set of first network parameter vectors does not converge to the set of second network parameter vectors.

In an embodiment, the set of first network parameter vectors is determined to be converged to the set of second network parameter vectors, in response to determining that each vector component in the first network parameter vector for a respective network parameter of the one or more network parameters falls within statistics of a set of corresponding vector components for the respective network parameter in the set of second network parameter vectors.

In an embodiment, the set of first network parameter vectors is determined to be converged to the set of second network parameter vectors, in response to determining that the set of first network parameter vectors comprises at least one network parameter vector that matches at least one network parameter vector in the set of second network parameter vectors.

In an embodiment, a first network parameter vector in the set of first network parameter vectors is determined to match a second network parameter vector in the set of second network parameter vectors in response to determining that each vector component in the first network parameter vector for a respective network parameter of the one or more network parameters is within a tolerance range from a corresponding vector component in the second network parameter vector for the respective network parameter.

In an embodiment, the tolerance range is one of: zero, or a non-zero tolerance range.

In an embodiment, a first tolerance range applied to comparing a first vector component in the first network parameter vector for a first respective network parameter of the one or more network parameters and a first corresponding vector component in the second network parameter vector for the first respective network parameter is different from a second tolerance range applied to comparing a second vector component in the first network parameter vector for a second respective network parameter of the one or more network parameters and a second corresponding vector component in the second network parameter vector for the second respective network parameter.

In an embodiment, the Bayesian module trains predictive modeling of the one or more network parameters with aggregated data derived from the collected network traffic data.

In an embodiment, the aggregated data indicates a performance improvement from a subset of static policies in the plurality of static policies over baseline performance of baseline values for the one or more network parameters.

In an embodiment, the one or more second optimal values are obtained from a combinatorial search across all candidate parameter values of the one or more network parameters via optimizing the objective function.

In an embodiment, the one or more second optimal values are obtained from a combinatorial search across all candidate parameter values of the one or more network parameters via optimizing the objective function.

In an embodiment, the one or more network parameters represent a subset of network parameters in a first plurality of network parameters; a network parameter vector in the set of first network parameter vectors comprises a first plurality of vector components storing a first plurality of optimal values for the first plurality of network parameters.

In an embodiment, the one or more network parameters represent a subset of network parameters in a second plurality of network parameters; a network parameter vector in the set of second network parameter vectors comprises a second plurality of vector components storing a second plurality of optimal values for the second plurality of network parameters.

In an embodiment, the one or more network parameters represent a complete set of network parameters represented in a network parameter vector in the set of first network parameter vectors; the one or more network parameters represent a subset of network parameters in a plurality of network parameters; a network parameter vector in the set of second network parameter vectors comprises a plurality of vector components storing a plurality of optimal values for the plurality of network parameters.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

8. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
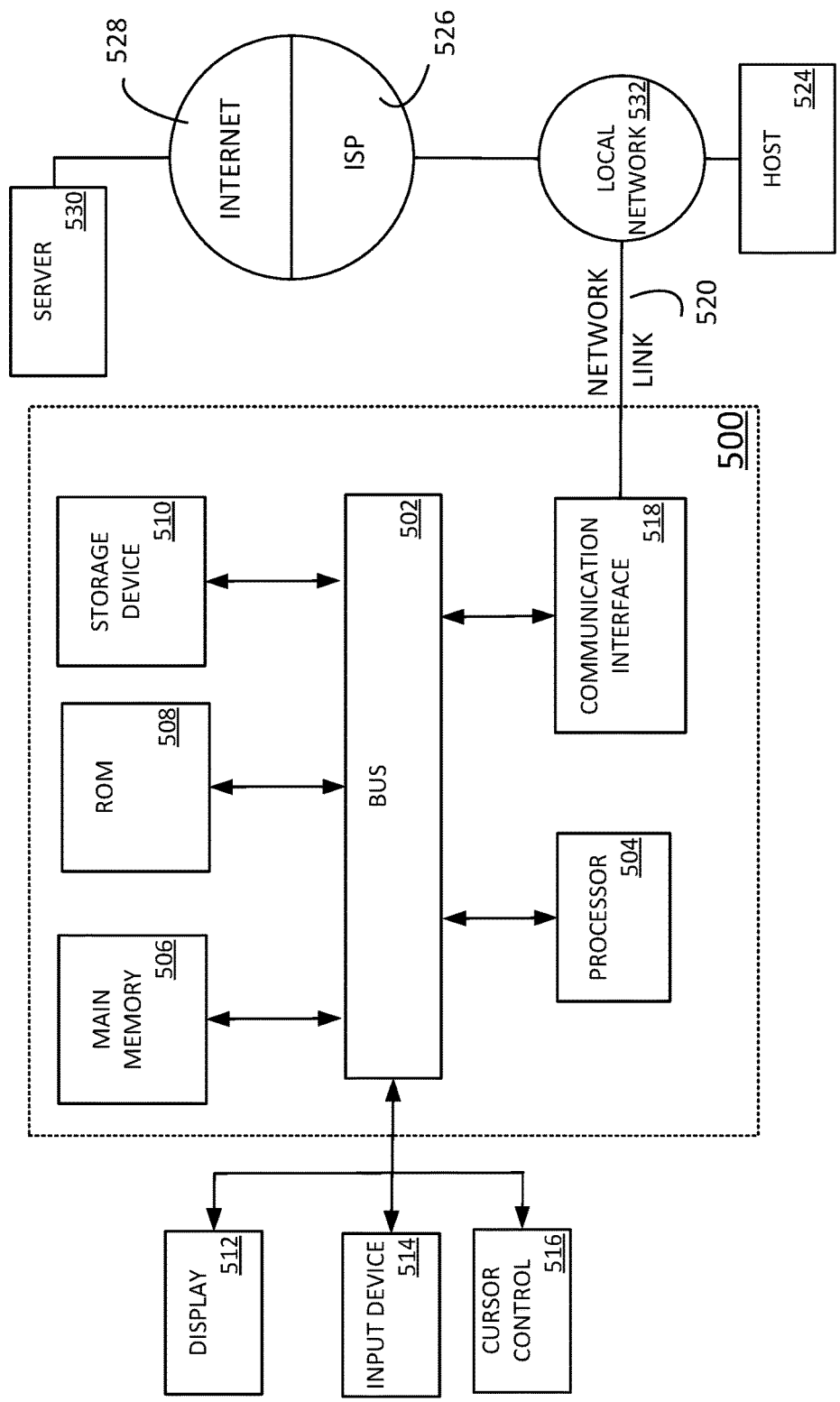
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
collecting network traffic data associated with a plurality of data requests to one or more computer applications;
generating one or more first optimal values for one or more TCP parameters, wherein the one or more first optimal values for the one or more TCP parameters are estimated by a generative Bayesian learning model;
generating one or more second optimal values for the one or more TCP parameters, wherein the one or more second optimal values for the one or more TCP parameters are computed through optimizing a network performance function based at least in part on the collected network traffic data;
determining whether the one or more first optimal values for the one or more TCP parameters converges to the one or more second optimal values for the one or more TCP parameters;
in response to determining that the one or more first optimal values converges to the one or more second optimal values, propagating one or more most recently estimated TCP parameter values for the one or more TCP parameters to one or more user devices for use in data download with the one or more computer applications.

2. The method as recited in claim 1, further comprising:
collecting a network traffic data portion associated with accelerated data download requests made by the one or more user devices to the one or more computer applications using the one or more most recently estimated TCP parameter values for the one or more TCP parameters;
determining, based at least in part on the network traffic data portion, accelerated download outcomes for accelerated data downloads in connection with the accelerated data requests;
determining whether the accelerated download outcomes are better than other download outcomes for other data downloads in connection with other data requests, to the one or more computer application, using other TCP parameter values for the one or more TCP parameters.

3. The method as recited in claim 2, wherein the download outcomes comprise one or more of: download complete time, speed throughput, time to download first byte, or time to establish a connection.

4. The method as recited in claim 1, wherein the one or more most recently estimated TCP parameter values for the one or more TCP parameters are prevented from being propagated to be used by one or more user devices to make one or more new data requests to the one or more computer applications, in response to determining that the one or more first optimal values do not converge to the one or more second optimal values.

5. The method as recited in claim 1, wherein the one or more first optimal values is determined to be converged to the one or more second optimal values, in response to determining that a first set of optimal values for the one or more TCP parameters estimated over each time point in a plurality of first time points over a time period by the generative Bayesian learning model has a non-empty intersection with a second set of optimal values for the one or more TCP parameters computed over each time point in a plurality of second time points over the same time period through optimizing the network performance function.

6. The method as recited in claim 5, wherein the time period represents one of: hours, days, or weeks.

7. The method as recited in claim 1, wherein the generative Bayesian learning model is trained with aggregated data derived from the collected network traffic data, and wherein the one or more second optimal values are obtained from a combinatorial search across all candidate parameter values of the one or more network parameters via optimizing the network performance function.

8. A non-transitory computer readable medium storing a set of computer instructions which, when executed by one or more computer processors, causes the one or more computer processors to perform:
collecting network traffic data associated with a plurality of data requests to one or more computer applications;
generating one or more first optimal values for one or more TCP parameters, wherein the one or more first optimal values for the one or more TCP parameters are estimated by a generative Bayesian learning model;
generating one or more second optimal values for the one or more TCP parameters, wherein the one or more second optimal values for the one or more TCP parameters are computed through optimizing a network performance function based at least in part on the collected network traffic data;
determining whether the one or more first optimal values for the one or more TCP parameters converges to the one or more second optimal values for the one or more TCP parameters;
in response to determining that the one or more first optimal values converges to the one or more second optimal values, propagating one or more most recently estimated TCP parameter values for the one or more TCP parameters to one or more user devices for use in data download with the one or more computer applications.

9. The non-transitory computer readable medium as recited in claim 8, wherein the set of computer instructions comprises further instructions which, when executed by the one or more computer processors, causes the one or more computer processors to perform:
collecting a network traffic data portion associated with accelerated data download requests made by the one or more user devices to the one or more computer applications using the one or more most recently estimated TCP parameter values for the one or more TCP parameters;
determining, based at least in part on the network traffic data portion, accelerated download outcomes for accelerated data downloads in connection with the accelerated data requests;
determining whether the accelerated download outcomes are better than other download outcomes for other data downloads in connection with other data requests, to the one or more computer application, using other TCP parameter values for the one or more TCP parameters.

10. The non-transitory computer readable medium as recited in claim 9, wherein the download outcomes comprise one or more of: download complete time, speed throughput, time to download first byte, or time to establish a connection.

11. The non-transitory computer readable medium as recited in claim 8, wherein the one or more most recently estimated TCP parameter values for the one or more TCP parameters are prevented from being propagated to be used by one or more user devices to make one or more new data requests to the one or more computer applications, in response to determining that the one or more first optimal values do not converge to the one or more second optimal values.

12. The non-transitory computer readable medium as recited in claim 8, wherein the one or more first optimal values is determined to be converged to the one or more second optimal values, in response to determining that a first set of optimal values for the one or more TCP parameters estimated over each time point in a plurality of first time points over a time period by the generative Bayesian learning model has a non-empty intersection with a second set of optimal values for the one or more TCP parameters computed over each time point in a plurality of second time points over the same time period through optimizing the network performance function.

13. The non-transitory computer readable medium as recited in claim 12, wherein the time period represents one of: hours, days, or weeks.

14. The non-transitory computer readable medium as recited in claim 8, wherein the generative Bayesian learning model is trained with aggregated data derived from the collected network traffic data, and wherein the one or more second optimal values are obtained from a combinatorial search across all candidate parameter values of the one or more network parameters via optimizing the network performance function.

15. An apparatus, comprising:
a subsystem, implemented at least partially in hardware, that collects network traffic data associated with a plurality of data requests to one or more computer applications;
a subsystem, implemented at least partially in hardware, that generates one or more first optimal values for one or more TCP parameters, wherein the one or more first optimal values for the one or more TCP parameters are estimated by a generative Bayesian learning model;
a subsystem, implemented at least partially in hardware, that generates one or more second optimal values for the one or more TCP parameters, wherein the one or more second optimal values for the one or more TCP parameters are computed through optimizing a network performance function based at least in part on the collected network traffic data;
a subsystem, implemented at least partially in hardware, that determines whether the one or more first optimal values for the one or more TCP parameters converges to the one or more second optimal values for the one or more TCP parameters;

a subsystem, implemented at least partially in hardware, that, in response to determining that the one or more first optimal values converges to the one or more second optimal values, propagates one or more most recently estimated TCP parameter values for the one or more TCP parameters to one or more user devices for use in data download with the one or more computer applications.

16. The apparatus as recited in claim 15, further comprising:
a subsystem, implemented at least partially in hardware, that collects a network traffic data portion associated with accelerated data download requests made by the one or more user devices to the one or more computer applications using the one or more most recently estimated TCP parameter values for the one or more TCP parameters;
a subsystem, implemented at least partially in hardware, that determines, based at least in part on the network traffic data portion, accelerated download outcomes for accelerated data downloads in connection with the accelerated data requests;
a subsystem, implemented at least partially in hardware, that determines whether the accelerated download outcomes are better than other download outcomes for other data downloads in connection with other data requests, to the one or more computer application, using other TCP parameter values for the one or more TCP parameters.

17. The apparatus as recited in claim 16, wherein the download outcomes comprise one or more of: download complete time, speed throughput, time to download first byte, or time to establish a connection.

18. The apparatus as recited in claim 15, wherein the one or more most recently estimated TCP parameter values for the one or more TCP parameters are prevented from being propagated to be used by one or more user devices to make one or more new data requests to the one or more computer applications, in response to determining that the one or more first optimal values do not converge to the one or more second optimal values.

19. The apparatus as recited in claim 15, wherein the one or more first optimal values is determined to be converged to the one or more second optimal values, in response to determining that a first set of optimal values for the one or more TCP parameters estimated over each time point in a plurality of first time points over a time period by the generative Bayesian learning model has a non-empty intersection with a second set of optimal values for the one or more TCP parameters computed over each time point in a plurality of second time points over the same time period through optimizing the network performance function.

20. The apparatus as recited in claim 19, wherein the time period represents one of: hours, days, or weeks.

21. The apparatus as recited in claim 15, wherein the generative Bayesian learning model is trained with aggregated data derived from the collected network traffic data, and wherein the one or more second optimal values are obtained from a combinatorial search across all candidate parameter values of the one or more network parameters via optimizing the network performance function.

* * * * *